(12) United States Patent
Wang et al.

(10) Patent No.: US 11,444,783 B2
(45) Date of Patent: Sep. 13, 2022

(54) METHODS AND APPARATUSES FOR PROCESSING TRANSACTIONS BASED ON BLOCKCHAIN INTEGRATED STATION

(71) Applicant: ALIPAY (HANGZHOU) INFORMATION TECHNOLOGY CO., LTD., Zhejiang (CN)

(72) Inventors: Jiang Wang, Hangzhou (CN); Fuxi Deng, Hangzhou (CN); Chao Zeng, Hangzhou (CN); Zongru Zhan, Hangzhou (CN); Xiaoli Liu, Hangzhou (CN); Zheng Cao, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,974

(22) Filed: Jun. 29, 2021

(65) Prior Publication Data
US 2021/0328810 A1    Oct. 21, 2021

(30) Foreign Application Priority Data

Jul. 8, 2020    (CN) .......................... 202010652946.1

(51) Int. Cl.
*H04L 67/568*    (2022.01)
*H04L 9/32*    (2006.01)
(Continued)

(52) U.S. Cl.
CPC ............ *H04L 9/3247* (2013.01); *G06F 9/466* (2013.01); *H04L 9/3239* (2013.01); *H04L 67/568* (2022.05); *H04L 9/50* (2022.05)

(58) Field of Classification Search
CPC . H04L 9/3247; H04L 9/3239; H04L 67/2842; H04L 2209/38; H04L 67/568; G06F 9/466

See application file for complete search history.

(56) References Cited

U.S. PATENT DOCUMENTS 9,071,589 B1 *   6/2015   Patnala ................. H04L 9/0825
10,181,948 B1    1/2019   Nenov et al.
(Continued)

FOREIGN PATENT DOCUMENTS

CN    102624726    8/2012
CN    102739473    10/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Theodore C Parsons
*Assistant Examiner* — Howard H. Louie
(74) *Attorney, Agent, or Firm* — Fish & Richardson P.C.

(57) ABSTRACT

Computer-implemented methods, apparatuses, and system for processing transactions using a blockchain integrated station are provided. The blockchain integrated station includes a central processing unit (CPU) and a smart network card, wherein the smart network card comprises a processor different from the CPU. The smart network card is configured to receive a transaction of a blockchain network, wherein the blockchain integrated station is a blockchain node of the blockchain network; write the transaction into a cache; in a process that the blockchain integrated station participates in a blockchain consensus of the blockchain network, perform consensus interactions with other blockchain nodes of the blockchain network based on the transaction in the cache; determine, based on a result of the blockchain consensus, a to-be-executed transaction list; and send the to-be-executed transaction list to the CPU.

20 Claims, 7 Drawing Sheets

(51) Int. Cl.
*G06F 9/46* (2006.01)
*H04L 9/00* (2022.01)

(56) References Cited

U.S. PATENT DOCUMENTS

| | | | |
|---|---|---|---|
| 10,785,035 B1 | 9/2020 | Lv | |
| 10,791,143 B1 | 9/2020 | Lv | |
| 11,150,963 B2 | 10/2021 | Nainar et al. | |
| 2004/0095883 A1 | 5/2004 | Chu et al. | |
| 2006/0015715 A1 | 1/2006 | Anderson | |
| 2010/0121947 A1 | 5/2010 | Pirzada et al. | |
| 2012/0102098 A1 | 4/2012 | Guillou et al. | |
| 2015/0127509 A1 | 5/2015 | Studnitzer et al. | |
| 2017/0149819 A1 | 5/2017 | Androulaki | |
| 2018/0018663 A1 | 1/2018 | Van et al. | |
| 2018/0173747 A1* | 6/2018 | Baird, III | G06F 16/2365 |
| 2018/0288126 A1 | 10/2018 | Smart et al. | |
| 2019/0018887 A1 | 1/2019 | Madisetti et al. | |
| 2019/0026146 A1 | 1/2019 | Peffers et al. | |
| 2019/0236565 A1 | 8/2019 | Song et al. | |
| 2019/0289031 A1 | 9/2019 | Kozloski et al. | |
| 2019/0296915 A1 | 9/2019 | Lancashire | |
| 2019/0370486 A1 | 12/2019 | Wang et al. | |
| 2020/0005292 A1 | 1/2020 | Mao et al. | |
| 2020/0013025 A1 | 1/2020 | Verma et al. | |
| 2020/0099512 A1 | 3/2020 | Kikinis | |
| 2020/0111105 A1 | 4/2020 | Gupta et al. | |
| 2020/0112427 A1 | 4/2020 | Nakamura et al. | |
| 2020/0127861 A1 | 4/2020 | Doshi et al. | |
| 2020/0128043 A1* | 4/2020 | Xie | H04L 63/1416 |
| 2020/0128044 A1 | 4/2020 | Xie | |
| 2020/0134737 A1 | 4/2020 | Wang et al. | |
| 2020/0136901 A1 | 4/2020 | Ballard et al. | |
| 2020/0136998 A1* | 4/2020 | Lu | H04L 49/9068 |
| 2020/0142986 A1 | 5/2020 | Ragnoli et al. | |
| 2020/0153605 A1 | 5/2020 | Hu et al. | |
| 2020/0175509 A1 | 6/2020 | Qi | |
| 2020/0250633 A1 | 8/2020 | Vinson et al. | |
| 2020/0278892 A1 | 9/2020 | Nainar et al. | |
| 2020/0304326 A1 | 9/2020 | Xie | |
| 2020/0314011 A1 | 10/2020 | Deval et al. | |
| 2020/0409952 A1 | 12/2020 | Dean et al. | |
| 2020/0412521 A1 | 12/2020 | Shi | |
| 2021/0117249 A1 | 4/2021 | Doshi et al. | |
| 2021/0211467 A1 | 7/2021 | Naeimi et al. | |
| 2021/0326863 A1 | 10/2021 | Zhan et al. | |
| 2021/0326887 A1 | 10/2021 | Zhan et al. | |
| 2021/0329093 A1 | 10/2021 | Zhan et al. | |
| 2021/0344753 A1 | 11/2021 | Zhan et al. | |

FOREIGN PATENT DOCUMENTS

| | | |
|---|---|---|
| CN | 102904730 | 1/2013 |
| CN | 104410617 | 3/2015 |
| CN | 205880913 | 1/2017 |
| CN | 106991607 | 7/2017 |
| CN | 107147735 | 9/2017 |
| CN | 107273213 | 10/2017 |
| CN | 107450981 | 12/2017 |
| CN | 108648078 | 10/2018 |
| CN | 108701187 | 10/2018 |
| CN | 108881120 | 11/2018 |
| CN | 109245926 | 1/2019 |
| CN | 109255661 | 1/2019 |
| CN | 109284185 | 1/2019 |
| CN | 109299335 | 2/2019 |
| CN | 109656855 | 4/2019 |
| CN | 109709589 | 5/2019 |
| CN | 109872161 | 6/2019 |
| CN | 109936513 | 6/2019 |
| CN | 109960671 | 7/2019 |
| CN | 110071876 | 7/2019 |
| CN | 110084604 | 8/2019 |
| CN | 110213058 | 9/2019 |
| CN | 110383279 | 10/2019 |
| CN | 110677402 | 1/2020 |
| CN | 110999214 | 4/2020 |
| CN | 109408523 | 6/2020 |
| CN | 111241201 | 6/2020 |
| CN | 111262868 | 6/2020 |
| CN | 111262924 | 6/2020 |
| CN | 111327603 | 6/2020 |
| CN | 111541789 | 8/2020 |
| CN | 111541727 | 10/2020 |
| CN | 111541783 | 10/2020 |
| CN | 111541788 | 10/2020 |
| CN | 111738859 | 10/2020 |
| CN | 111539829 | 12/2020 |
| CN | 111541725 | 4/2021 |
| CN | 112667748 | 4/2021 |
| CN | 111541726 | 5/2021 |
| CN | 111541785 | 5/2021 |
| CN | 111538996 | 6/2021 |
| CN | 111541552 | 6/2021 |
| CN | 111541724 | 6/2021 |
| CN | 111541784 | 7/2021 |
| CN | 111541553 | 8/2021 |
| CN | 113364847 | 9/2021 |
| EP | 3432146 | 1/2019 |
| EP | 3496332 | 6/2019 |
| EP | 3591931 | 1/2020 |
| WO | WO 2019072312 | 4/2019 |
| WO | WO 2019137563 | 7/2019 |
| WO | WO 2019229612 | 12/2019 |

OTHER PUBLICATIONS

Nakamoto, "Bitcoin: A Peer-to-Peer Electronic Cash System," www.bitcoin.org, 2005, 9 pages.
BiFuWa, "BlockChain + Chips: China's Chip Dilemma is Broken by Speculating Coins," JianShu, May 12, 2018, 10 pages (with English machine translation).
U.S. Appl. No. 17/362,941, Zhan et al, filed Jun. 29, 2021.
U.S. Appl. No. 17/362,891, Zhan et al, filed Jun. 29, 2021.
U.S. Appl. No. 17/362,444, Zhan et al, filed Jun. 29, 2021.
U.S. Appl. No. 17/362,327, Zhan et al, filed Jun. 29, 2021.
EP Extended Search Report in European Application No. 21181100. 5, dated Nov. 23, 2021, 11 pages.
EP Extended Search Report in European Application No. 21181645. 9, dated Nov. 30, 2021, 7 pages.
EP Extended Search Report in European Application No. 21181659. 0, dated Dec. 1, 2021, 6 pages.
Sakakibara et al, "Accelerating Blockchain Transfer System Using FPGA-Based NIC", IEEE Xplore, Dec. 11, 2018, 8 pages.
EP Extended Search Report in European Application No. 21182218. 4, dated Dec. 2021, 11 pages.
EP Extended Serach Report in European Application No. 21179739. 4, dated Dec. 20, 2021, 8 pages.
Mahony et al, "A Systematic Review of Blockchain Hardware Acceleration Architectures", IEEE Xplore, Jun. 17, 2019, 6 pages.

* cited by examiner

METHODS AND APPARATUSES FOR PROCESSING TRANSACTIONS BASED ON BLOCKCHAIN INTEGRATED STATION

CROSS-REFERENCE TO RELATED APPLICATIONS

This application claims priority to Chinese Patent Application No. 202010652946.1, filed on Jul. 8, 2020, which is hereby incorporated by reference in its entirety.

TECHNICAL FIELD

The present disclosure relates the field of information technologies, and in particular to methods and apparatuses for processing transactions based on a blockchain integrated station.

BACKGROUND

Blockchain technology (also referred to as a distributed ledger technology) is a decentralized distributed database technology having characteristics such as openness, transparency, immutability and trustability, and thus it is applicable to many application scenarios with high demands for data reliability. At present, a transaction is usually processed by a Central Processing Unit (CPU) of a node (for example, performing consensus for a to-be-executed transaction, executing a transaction and writing the executed transaction into a blockchain and the like).

Based on the existing technology, a method of processing a blockchain transaction with a higher efficiency is needed.

SUMMARY

In order to solve the lower efficiency of the existing method of processing a blockchain transaction, the embodiments of the present disclosure provide methods and apparatuses for processing transactions based on a blockchain integrated station. The following technical solution is adopted.

According to a first aspect of embodiments of the present disclosure, provided is a method of processing a transaction based on a blockchain integrated station. The blockchain integrated station includes a Central Processing Unit (CPU) and a smart network card and is any node of a blockchain network. The method includes: when the blockchain integrated station receives a transaction through the smart network card, writing, by the smart network card, the received transaction into a network card cache; performing, by the smart network card, consensus interaction with other nodes of the blockchain network based on the transaction in the network card cache in a process that the blockchain integrated station participates in a blockchain consensus; determining and sending, by the smart network card, a to-be-executed transaction list to the CPU based on a result of the consensus; and executing, by the CPU, transaction based on the to-be-executed transaction list, and completing transaction chaining.

According to a second aspect of embodiments of the present disclosure, provided is a method of processing a transaction based on a blockchain integrated station, which is applied to a smart network card of the blockchain integrated station. The blockchain integrated station further includes a Central Processing Unit (CPU) and is any node of a blockchain network. The method includes: when the blockchain integrated station receives a transaction through the smart network card, writing the received transaction into a network card cache; performing consensus interaction with other nodes of the blockchain network based on the transaction in the network card cache in a process that the blockchain integrated station participates in a blockchain consensus; and determining and sending a to-be-executed transaction list to the CPU based on a result of the consensus.

According to a third aspect of embodiments of the present disclosure, provided is another method of processing a transaction based on a blockchain integrated station, which is applied to a Central Processing unit (CPU) of the blockchain integrated station. The blockchain integrated station further includes a smart network card and is any node of a blockchain network. The method includes: executing, by the CPU, transaction based on a to-be-executed transaction list sent by the smart network card, and completing transaction chaining.

According to a fourth aspect of embodiments of the present disclosure, provided is an apparatus for processing a transaction based on a blockchain integrated station, which is applied to a smart network card of the blockchain integrated station. The blockchain integrated station further includes a Central Processing Unit (CPU) and is any node of a blockchain network. The method includes: a caching module, configured to, when the blockchain integrated station receives a transaction through the smart network card, write the received transaction into a network card cache; a consensus interacting module, configured to perform consensus interaction with other nodes of the blockchain network based on the transaction in the network card cache in a process that the blockchain integrated station participates in a blockchain consensus; and a sending module, configured to determine and send a to-be-executed transaction list to the CPU based on a result of the consensus.

According to a fifth aspect of embodiments of the present disclosure, provided is an apparatus for processing a transaction based on a blockchain integrated station, which is applied to a Central Processing unit (CPU) of the blockchain integrated station. The blockchain integrated station further includes a smart network card and is any node of a blockchain network. The apparatus includes: a chaining executing module, configured to execute transaction based on a to-be-executed transaction list sent by the smart network card and complete transaction chaining.

In the technical solutions according to the embodiments of the present disclosure, the blockchain integrated station includes a CPU and a smart network card, the smart network card is a network card having a built-in processor or microprocessor and can perform data computation and processing. The smart network card can replace the CPU to actually participate in a blockchain consensus on behalf of the blockchain integrated station, and send a to-be-executed transaction list to the CPU for transaction execution and transaction chaining based on a result of the consensus.

According to the embodiments of the present disclosure, the following technical effects can be achieved by transferring operations such as blockchain consensus needing frequent network interaction with other nodes from the CPU to the smart network card:

1. The smart network card is specifically in charge of blockchain consensus, while the CPU focuses on transaction execution and transaction chaining. In this case, the operation efficiency of the blockchain integrated station serving as a node can be improved, and the CPU can also execute more transactions within a unit time, thereby improving throughput.

2. In a blockchain consensus process, the network traffic does not need to flow through the CPU but is received by the smart network card for direct processing and feedback. Thus, the CPU does not participate in the consensus process, so that the feedback delay of the blockchain integrated station in the consensus process is reduced.

It should be understood that the above general descriptions and the subsequent detailed descriptions are merely examples and illustrative, and are not intended to limit the embodiments of the present disclosure.

In addition, any of the embodiments of the present disclosure is not needed to achieve all effects above-mentioned.

BRIEF DESCRIPTION OF THE DRAWINGS

To describe the technical solutions in the embodiments of the present disclosure or in the existing technology more clearly, drawings needed in descriptions of the embodiments of the present disclosure or the existing technology will be briefly introduced below. It is clear that the drawings described below are merely some embodiments of the present disclosure and other drawings can also be obtained by those of ordinary skill in the art based on these drawings.

DETAILED DESCRIPTION OF THE EMBODIMENTS

Figure 1:
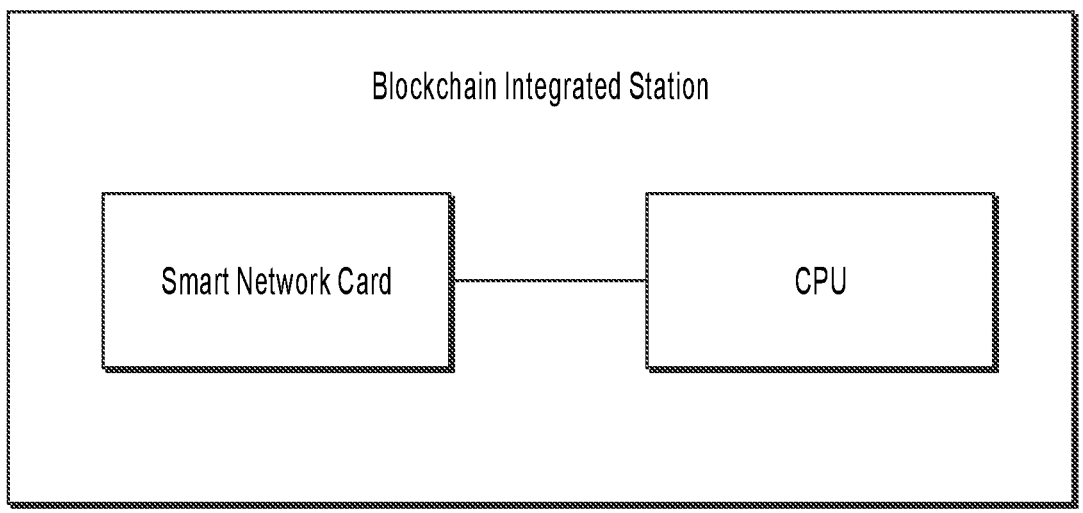
FIG. 1 is an institutional schematic diagram of a blockchain integrated station according to embodiments of the present disclosure.

In the early stage of development of the blockchain technology, users mostly add their own personal computer (PC) and laptop computer, and the like into a blockchain network to become a blockchain node in the blockchain network. At this time, the stage can be called 1.0 architecture era of the blockchain network, in which behaviors of users to participate in the blockchain network are autonomous and the users also need to perform autonomous maintenance, for example, perform maintenance and configuration, and so on for their devices, for example, PC, participating in the blockchain network. Along with continuous development of the blockchain technology, especially along with increasing needs of users for infrastructures with high performance and high availability, the blockchain network develops into 2.0 architecture era based on a cloud service. In the 2.0 architecture era, cloud service providers provide the infrastructures with high performance and high availability to the users based on higher-performance servers and cloud computing, so as to configure and form blockchain nodes needed by the users. To satisfy the needs of users for privatization, security, and the like of the blockchain network, architecture needs to be upgraded further to the blockchain network, thereby realizing 3.0 architecture era based on a blockchain integrated station.

Software and hardware integration can be realized for the blockchain integrated station. When a blockchain integrated station is published, a provider not only provides hardware devices of the blockchain integrated station to users but also provides software configurations for realizing deep optimization of the hardware devices integrated into the blockchain integrated station, thereby realizing the above-mentioned software-hardware integration.

Hardware optimization can be realized for the blockchain integrated station. For example, a dedicated smart contract processing chip can be deployed on the blockchain integrated station. For example, the smart contract processing chip can be a Field Programmable Gate Array (FPGA) chip, or another type of chip to improve a processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the public key is disclosed). Therefore, the smart contract processing chip can send negotiation information to the provider and sign the negotiation information by using the hardware root-of-trust key, so that the provider can verify the signature based on the corresponding public key; and, after the signature is successfully verified, it is ensured that the smart contract processing chip and the provider obtain the same key through negotiation based on the above-mentioned negotiation information respectively. The negotiated key can include a file deployment key, and thus the provider can encrypt and transmit a binary image file needed by the blockchain node to the smart contract processing chip based on the file deployment key, and the smart contract processing chip can decrypt and deploy the binary image file based on the file deployment key. The negotiated key can include a service secret deployment key, and thus the provider can encrypt and transmit a node private key, a service root key, and the like of the blockchain node to the smart contract processing chip based on the service secret deployment key, and the smart contract processing chip can obtain and deploy the node private key, the service root key, and the like based on the service secret deployment key to satisfy the privacy transaction needs in a blockchain scenario. For example, the node private key corresponds to a node public key, and thus a client device can perform encrypted transmission for a blockchain transaction by using the node public key, and the blockchain node can perform decryption through the node private key. The service root key is a symmetric key that can be used to perform encrypted storage for service data such as contract codes and values of contract statuses. The service root key may not be directly used, and the smart contract processing chip can perform encryption and decryption through a derivation key of the service root key to reduce a security risk of the service root key. Through reliable management for the node private key and the service root key (or its derivation key), data is always in an encrypted state unless processed by the smart contract processing chip. Therefore, the smart contract processing chip actually forms a Trusted Execution Environment (TEE) of hardware on the blockchain integrated station, so as to ensure the data needing privacy protection such as transactions, contract codes, and contract statuses not to be leaked.

For another example, a smart network card can be deployed on the blockchain integrated station. In addition to realizing functions of a traditional network card, the smart network card can also replace or assist a CPU of the blockchain integrated station to perform partial functions so as to offload computation of the CPU. Especially, the operations with intensive network I/O can be transferred from the CPU to the smart network card to perform, so that the CPU can process more computation-intensive operations, such as transaction executing and storage processing. Compared with other components (e.g., CPU) in the blockchain integrated station, the smart network card is closer to the network on both physical level and logical level, so the smart network card always fetches data transmitted in the network preferentially. Therefore, with no storage access or a small amount of storage access is involved, the smart network card can process the data with a relatively higher processing efficiency, a relatively smaller delay and a relatively larger throughput, so as to achieve a higher performance benefit with a relatively lower cost. For example, in a consensus algorithm, there is almost no need to access storage except in the cases of a change of the network state, addition and deletion of the node, a change of consensus configuration, and the like. Therefore, the consensus operation can be completed by the smart network card and only need to inform the CPU of a consensus result. Therefore, the CPU is not needed to directly participate in the consensus process, thereby significantly improving consensus efficiency. Similarly, a similar effect can be achieved in transferring transactions by the smart network card and achieving block synchronization by the smart network card on a newly-added blockchain node and the like, which will not be repeated herein. Furthermore, after receiving transactions, the smart network card can identify or filter out a replay transaction by comparing the received transactions with historical transactions, for example, comparing data fields such as sender information of transaction, destination address, time stamp, and hash value and the like. The smart network card can also perform content analysis for the received transactions, so as to filter out illegal transactions or predefined undesired transactions, or the like as a supplementation to layer-2 or layer-3 packet filtering implemented by a switch.

For another example, a cryptographic acceleration card which is also called a high-speed cryptographic card can be deployed on the blockchain integrated station. The cryptographic acceleration card can realize total encrypted memory, defend against side channel attacks by hardware reinforcement, and also realize physical protection against approaches such as probe and laser, having very high security. For example, the cryptographic acceleration card used on the blockchain integrated station can have level-2 qualification from the state cryptography administration, level-3 qualification from the state cryptography administration, or the like. When the cryptographic acceleration card is deployed, the hardware roof-of-trust key described above can be maintained in the cryptographic acceleration card, and the cryptographic acceleration card can perform a signature operation based on the hardware roof-of-trust key and replace or assist the smart contract processing chip to complete the operations such as key negotiation described above. Similarly, the cryptographic acceleration card can be used to maintain a public key so that the cryptographic acceleration card can realize an operation of signature verification based on the maintained public key. In short, at least a part of operations relating to key management, encryption and decryption, signature verification, and the like on the blockchain integrated station can be handed over to the cryptographic acceleration card, so that very high security can be obtained and task offloading can also be realized for the CPU of the blockchain integrated station or the above-mentioned smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction and automatic adding of blockchain nodes, thereby realizing plug and play of the blockchain integrated station. In this case, a user can realize fast deployment of the blockchain integrated station. In addition to quickly constructing a private blockchain network between a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares a computation task for a blockchain node), and the like.

The technical solution according to each embodiment of the present disclosure will be described in detail below in combination with the drawings.

FIG. 1 is a structural schematic diagram of a blockchain integrated station according to embodiments of the present disclosure. As shown in FIG. 1, the blockchain integrated station includes a Central Processing Unit (CPU) and a smart network card. Different from a traditional network card only supporting network communication, the smart network card of the present disclosure is a network card with a built-in processor or microprocessor (e.g., an ARM processor), and thus has a certain data computing and processing capability. Certainly, it can be understood that the blockchain integrated station as a node of a blockchain network also includes a memory not shown in FIG. 1. The memory is used to store a blockchain itself, or the memory is also used to store a state database for an Ethereum blockchain.

In addition, the blockchain integrated station can further include other hardware, such as a smart contract processing chip and a cryptographic acceleration card.

Figure 2:
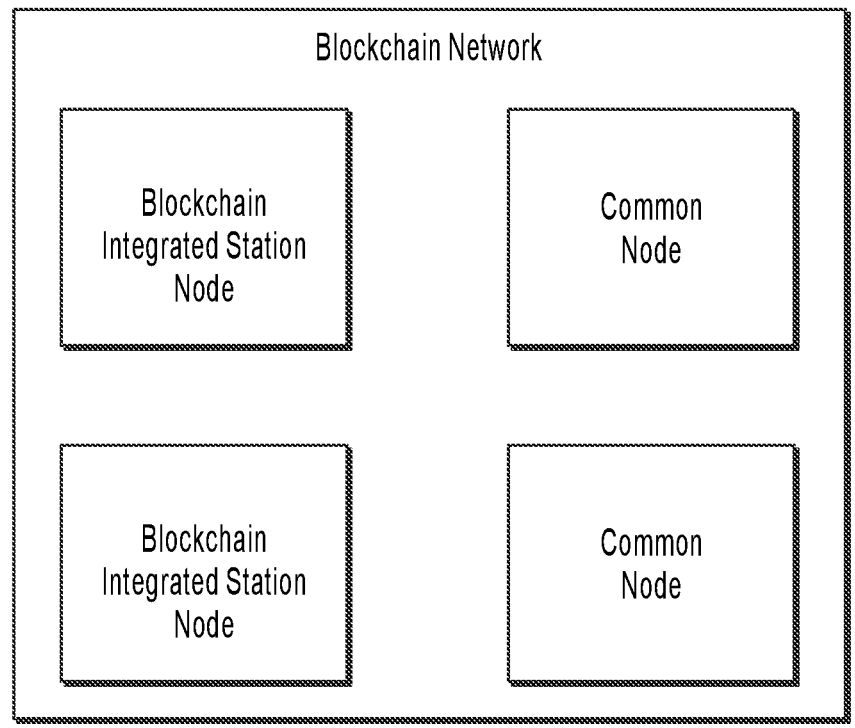
FIG. 2 is a structural schematic diagram of a blockchain system according to embodiments of the present disclosure.

FIG. 2 is a structural schematic diagram of a blockchain system according to embodiments of the present disclosure. The blockchain system includes a blockchain network. In the blockchain network, at least one node can serve as a blockchain integrated station. That is, the blockchain integrated station as a node can interact with other nodes (common nodes) which are not blockchain integrated stations, or can interact with other nodes which are also blockchain integrated stations. For convenience of description, the technical solutions will be described with a single blockchain integrated station herein.

Figure 3:
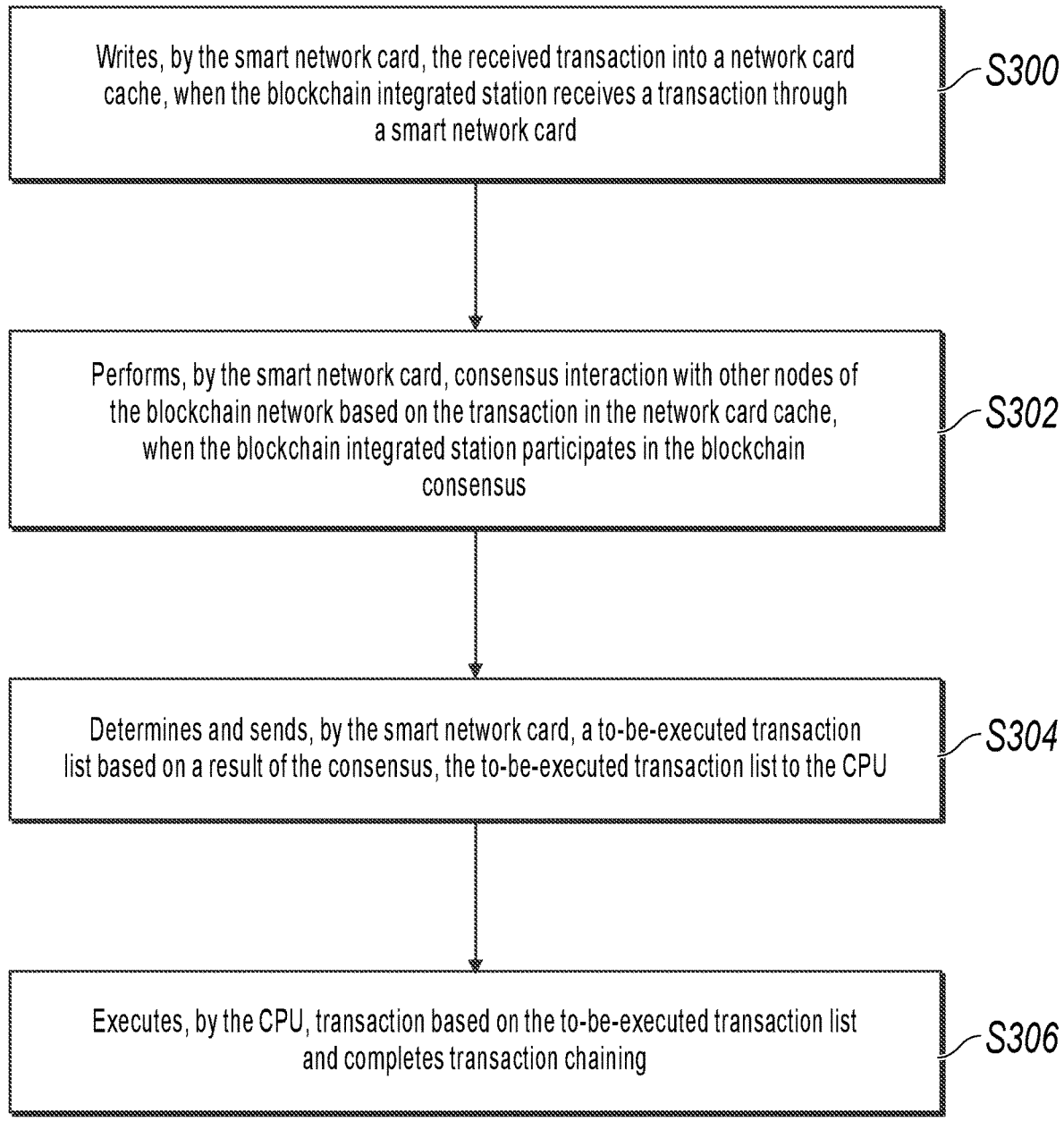
FIG. 3 is a flowchart of a method of processing a transaction based on a blockchain integrated station according to embodiments of the present disclosure.

FIG. 3 is a flowchart of a method of processing a transaction based on a blockchain integrated station according to embodiments of the present disclosure. The method includes the following steps:

At step S300, when the blockchain integrated station receives a transaction through a smart network card, the smart network card writes the received transaction into a network card cache.

It is well known that a blockchain network usually processes a transaction in three stages, i.e. a transaction reception stage, a consensus stage and a transaction execution and chaining stage. Firstly, the above-mentioned three stages will be briefly introduced herein.

In the transaction reception stage, each node in the blockchain network receives and caches a transaction to prepare for subsequent consensus and transaction execution. Specifically, a client device constructs a transaction and submits the transaction to any node in the blockchain network, so that the node directly receives and caches the transaction, and broadcasts the transaction to the entire network to enable other nodes to indirectly receive the transaction. The blockchain integrated station receiving the transaction through the smart network card at step 300 can refer to that the blockchain integrated station directly receives the transaction, or the blockchain integrated station indirectly receives the transaction. In short, regardless of direct reception or indirect reception, it is important that most nodes in the blockchain network will cache the same transaction. It can be understood that in an actual application, a small number of nodes may not receive the transaction due to shutdown or network problem, which, however, will not affect the operation of a distributed blockchain network.

In the consensus stage, various nodes of the blockchain network perform interaction based on a consensus algorithm (e.g., Byzantine fault tolerance algorithm) to achieve message consistency, that is, to reach a consensus on which received transactions are to be executed this time. It can be understood that in the actual application, not every node participates in the consensus. However, because the consensus algorithm has fault tolerance, a consensus result will not be affected.

In the transaction execution and chaining stage, each node will fetch a transaction from the cache for execution based on the consensus result, and the fetched transaction is then packaged into a block and written into the blockchain (i.e., transaction chaining) after execution.

The cache in above-mentioned introduction usually refers to a cache of a CPU of a node. In the embodiments of the present disclosure, because a smart network card is configured for the node, the cache can include a network card cache and a CPU cache. In the transaction reception stage, the smart network card writes a transaction into the network card cache so as to perform subsequent blockchain consensus based on the transaction in the network card cache.

At step S302, when the blockchain integrated station participates in the blockchain consensus, the smart network card performs consensus interaction with other nodes of the blockchain network based on the transaction in the network card cache.

In the consensus stage, the smart network card replaces the CPU to actually participate in the consensus and perform consensus interaction with other nodes. Network traffic generated in the consensus process directly enters the smart network card, and the smart network card processes the network traffic based on the consensus algorithm and directly feeds back a processing result. Therefore, the network traffic will not flow through the CPU.

At step S304, the smart network card determines a to-be-executed transaction list based on a result of the consensus, and sends the to-be-executed transaction list to the CPU.

It is well known that the blockchain network performs consensus again and again according to a certain consensus trigger condition. For example, the consensus trigger condition can be that one consensus is performed every ten minutes, which means that the blockchain network determines one batch of to-be-executed transactions every ten minutes, and packages this batch of to-be-executed transactions into a block for chaining. The consensus result actually refers to those to-be-executed transactions determined in one blockchain consensus.

It should be noted herein that an access operation for blockchain storage (the blockchain and the state database) generally needs to be performed by the CPU for efficiency. In an actual application, Practical Byzantine Fault Tolerance (PBFT) algorithm is usually adopted, but the blockchain storage does not need to be accessed (the blockchain and the state database) for a host change operation involved in the PBFT algorithm process. Therefore, the CPU neither actually participates in the consensus process nor adversely affects efficiency of storage access.

Specifically, the to-be-executed transaction list described at step S304 can be a list formed by the to-be-executed transactions determined by the present blockchain consensus, or can be a list formed by transaction identifiers (e.g., transaction hashes) of the to-be-executed transactions determined by the present blockchain consensus.

When the to-be-executed transaction list includes transaction hashes, the smart network card also needs to send the to-be-executed transactions to the CPU. In an actual application, the smart network card can send the received transactions to the CPU while writing the received transactions into the network card cache in the transaction reception stage. The CPU writes the received transactions into the CPU cache.

At step S306, the CPU executes transaction based on the to-be-executed transaction list and completes transaction chaining.

In embodiments of the present disclosure, in the process that the blockchain integrated station participates in the blockchain consensus, the smart network card sends consensus configuration modification information to the CPU if receiving the consensus configuration modification information. The CPU can modify a consensus configuration locally stored in the blockchain integrated station based on the consensus configuration modification information.

Because the blockchain storage needs to be accessed for the operation of modifying the consensus configuration (for example, adding or deleting nodes; for another example, determining a capacity size of one batch of to-be-executed transactions, i.e. a batch size, in one consensus), the operation needs to be performed by the CPU for efficiency of storage access. Normally, if the modification of consensus configuration is not involved in the consensus process, the CPU will not participate in the consensus.

In addition, execution results generated by the CPU by executing transaction based on the to-be-executed transaction list are sent to the smart network card, and these execution results are reference information needed by the smart network card for participating in the next consensus. For example, the CPU executes a transaction initiated by an account A, which consumes 100 GAS of the account A with only 50 GAS left in the account A. This means that the account A cannot provide sufficient GAS for other transactions initiated by the account A. In this case, the CPU sends this execution result to the smart network card, and the smart network card will not tend to determine other transactions initiated by the account A as to-be-executed transactions in the next consensus.

According to the method shown in FIG. 3, the blockchain integrated station includes a CPU and a smart network card, and the smart network card is a network card having a built-in processor or microprocessor and can perform data computing and processing. The smart network card replaces the CPU to actually participate in a blockchain consensus on behalf of the blockchain integrated station, and sends a to-be-executed transaction list to the CPU for transaction execution and transaction chaining based on a result of the consensus.

According to the embodiments of the present disclosure, the following technical effects can be achieved by transferring operations such as blockchain consensus needing frequent network interaction with other nodes from the CPU to the smart network card:

1. The smart network card is specifically in charge of blockchain consensus, while the CPU focuses on transaction execution and transaction chaining. In this case, the operation efficiency of the blockchain integrated station serving as a node can be improved, and the CPU can also execute more transactions within a unit time, thereby improving throughput.

2. In a blockchain consensus process, the network traffic does not need to flow through the CPU but is received by the smart network card for direct processing and feedback. Thus, the CPU does not participate in the consensus process, so that the feedback delay of the blockchain integrated station in the consensus process is reduced.

Figure 4:
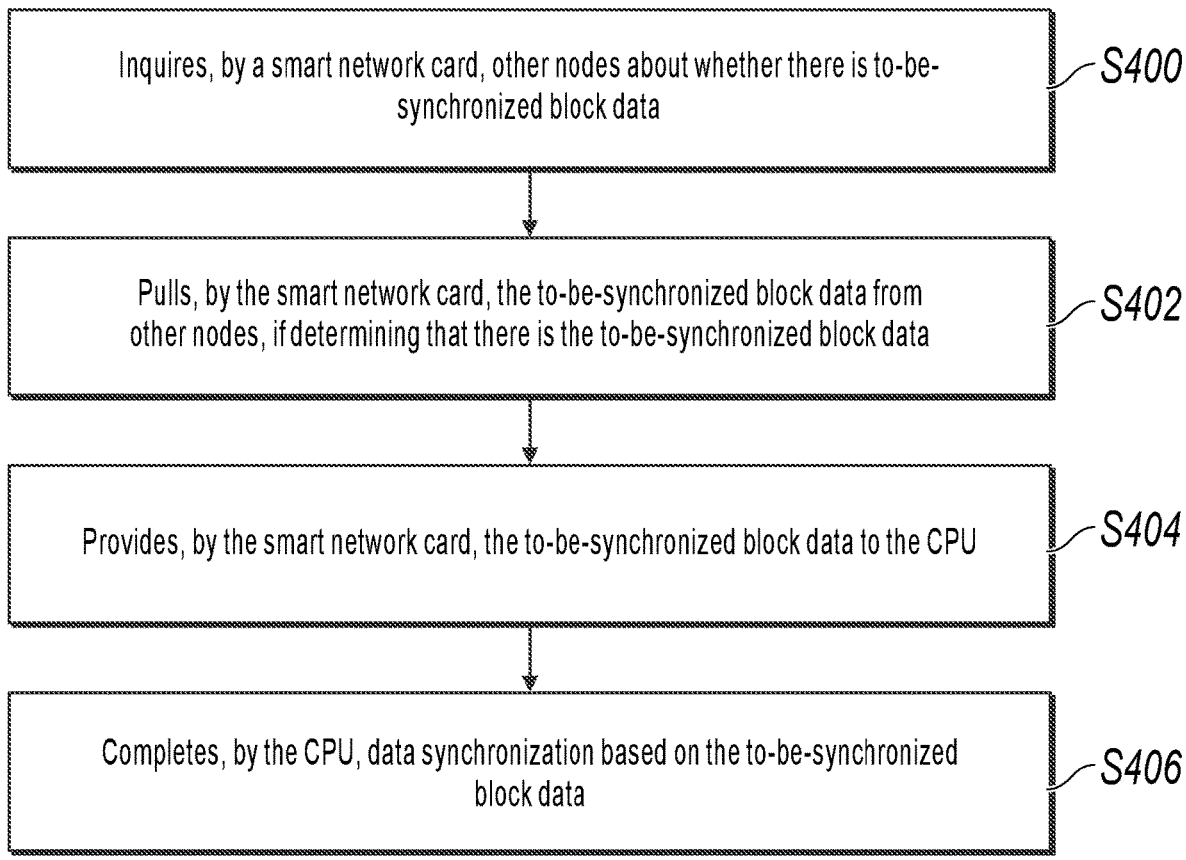
FIG. 4 is a flowchart of a method of synchronizing data based on a blockchain integrated station according to embodiments of the present disclosure.

FIG. 4 is a flowchart of a method of synchronizing data based on a blockchain integrated station according to embodiments of the present disclosure. The method includes the following steps:

At step S400, a smart network card inquires other nodes about whether there is to-be-synchronized block data.

Generally, when there is a newly-added node in a blockchain network, the node needs to pull block data from other nodes for synchronization. In addition, in other cases, sometimes a node also needs to pull block data from other nodes for synchronization, which will not be repeated herein.

To determine whether to perform data synchronization currently, the node usually needs to frequently inquire other nodes about whether there is to-be-synchronized block data, which will involve frequent I/O operations. In embodiments of the present disclosure, the smart network card is in charge of inquiring other nodes about whether there is to-be-synchronized block data, so as to offload this part of operation burden of a CPU, thereby improving the processing efficiency of the CPU.

At step S402, if determining that there is the to-be-synchronized block data, the smart network card pulls the to-be-synchronized block data from other nodes.

After determining that there is to-be-synchronized block data in other nodes, the node needs to pull the to-be-synchronized block data from other nodes. This means that the node needs to maintain a process of pulling data from network and take time to wait for completion of data pulling. If this part of operation is handed over to the smart network card for execution, operation burden can also be offloaded for the CPU, thereby improving the operation efficiency of the CPU.

At step S404, the smart network card provides the to-be-synchronized block data to the CPU.

Specifically, the smart network card can directly send the to-be-synchronized block data to the CPU, or writes the to-be-synchronized block data into a public cache between the smart network card and the CPU, and the CPU can fetch the to-be-synchronized block data from the public cache. For example, the CPU can fetch the to-be-synchronized block data from the public cache for data synchronization in an idle time.

At step S406, the CPU completes data synchronization based on the to-be-synchronized block data.

After obtaining the to-be-synchronized block data, the smart network card sends the to-be-synchronized block data to the CPU. At this time, the CPU only needs to write the to-be-synchronized block data into a local blockchain of the node without consuming excessive resource and time.

According to the method shown in FIG. 4, a blockchain integrated station includes a CPU and a smart network card, and the smart network card is a network card having a built-in processor or microprocessor and can perform data computing and processing. The smart network card can replace the CPU to actually participate in a blockchain consensus on behalf of the blockchain integrated station, and sends a to-be-executed transaction list to the CPU for transaction execution and transaction chaining based on a result of the consensus.

According to the embodiments of the present disclosure, the following technical effects can be achieved by transferring operations such as blockchain consensus needing frequent network interaction with other nodes from the CPU to the smart network card:

1. The smart network card is specifically in charge of blockchain consensus, while the CPU focuses on transaction execution and transaction chaining. In this case, the operation efficiency of the blockchain integrated station serving as a node is improved, and the CPU can also execute more transactions within a unit time, thereby improving throughput.

2. In a blockchain consensus process, the network traffic does not need to flow through the CPU but is received by the smart network card for direct processing and feedback. Thus, the CPU does not participate in the consensus process, so that the feedback delay of the blockchain integrated station in the consensus process is reduced.

Figure 5:
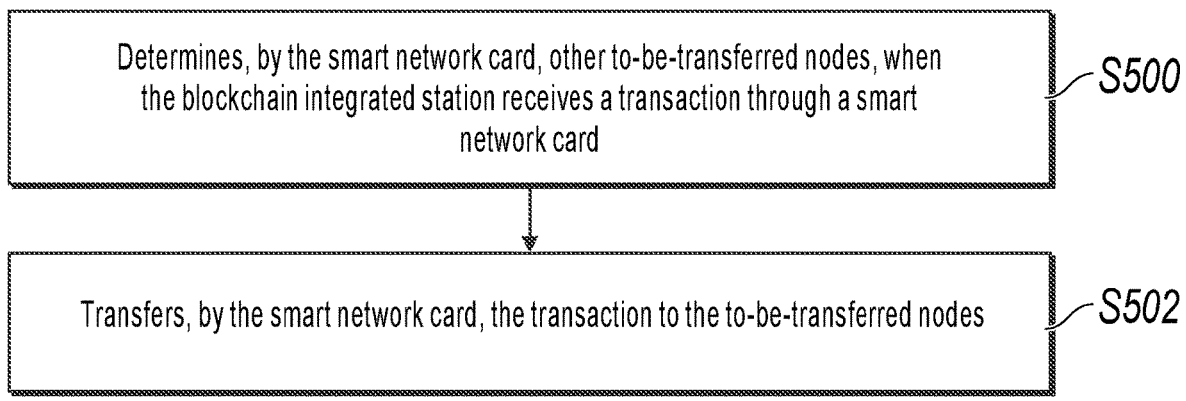
FIG. 5 is a flowchart of a method of transferring a transaction based on a blockchain integrated station according to embodiments of the present disclosure.

FIG. 5 is a flowchart of a method of transferring a transaction based on a blockchain integrated station according to embodiments of the present disclosure. The method includes the following steps:

At step S500, when the blockchain integrated station receives a transaction through a smart network card, the smart network card determines other to-be-transferred nodes.

At step S502, the smart network card transfers the transaction to the to-be-transferred nodes.

In the transaction reception stage, in addition to transferring the received transaction, the smart network card can also write the received transaction into a network card cache to implement the method shown in FIG. 3.

Generally, before transferring and caching the received transaction, the smart network card can perform legality verification for the transaction. The legality verification usually involves some legality items to be verified based on a blockchain protocol (for example, signature verification of an account initiating a transaction).

If the legality verification fails, the smart network card generally does not transfer the transaction.

The smart network card can discard a transaction that fails in legality verification. In addition, it should be noted that in an actual application, the smart network card can also retain a transaction that fails in legality verification, and write the transaction into the network card cache and send the transaction to a CPU for the following reason: when a transaction fails to pass a legality verification performed by a node, it does not necessarily mean that the transaction is illegal but can mean that the transaction loses part of data in network transmission, or an error can occur to the verification of the node. For a blockchain network as a distributed database, wrong transaction verification results obtained by a small number of nodes shall not affect the execution of the transaction. Therefore, even if a transaction fails to pass the legality verification performed by a node, the node can still retain the transaction which can be subsequently determined as a to-be-executed transaction by the entire network through consensus in the consensus stage.

In addition, in embodiments of the present disclosure, if a transaction passes the legality verification performed by the smart network card, the smart network card can mark the transaction. Further, the smart network card can send the marked transaction to the CPU. Generally, the CPU can determine whether the transaction passes legality verification before writing the transaction into a CPU cache. If the transaction has a mark, it indicates that the smart network card already successfully performs verification, and the CPU does not need to perform verification again. If the transaction does not have a mark, it indicates that the smart network card unsuccessfully performs verification, and the CPU can choose to record that the transaction fails to pass the verification, or to perform verification on the transaction again.

According to the method shown in FIG. 5, a blockchain integrated station includes a CPU and a smart network card, and the smart network card is a network card having a built-in processor or microprocessor and can perform data computing and processing. The smart network card can replace the CPU to perform transaction transferring in the transaction reception stage.

According to the embodiments of the present disclosure, the following technical effects can be achieved by transferring operations such as transaction transferring needing frequent network interaction with other nodes from the CPU to the smart network card:

1. The smart network card is specifically in charge of transaction transferring to offload this part of operation burden for the CPU. In this case the operation efficiency of the blockchain integrated station serving as a node is improved, and the CPU can also execute more transactions within a unit time, thereby improving throughput.

2. In a blockchain transferring process, the network traffic does not need to flow through the CPU but is received by the smart network card for direct processing and feedback so that the feedback delay of the blockchain integrated station is reduced.

Figure 6:
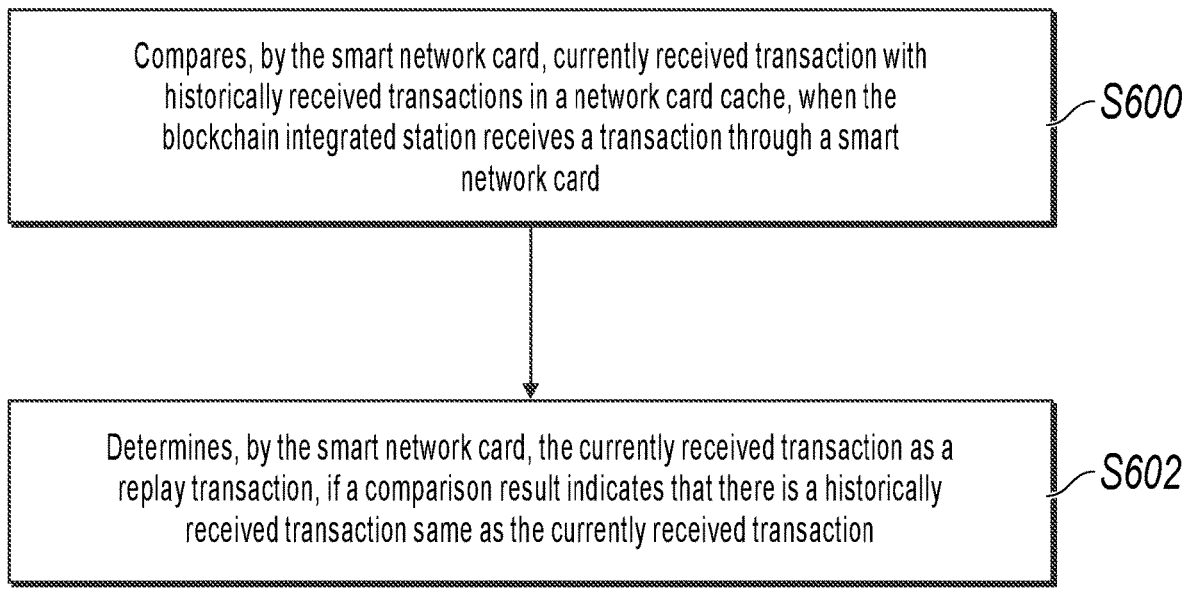
FIG. 6 is a flowchart of a method of identifying a replay transaction based on a blockchain integrated station according to embodiments of the present disclosure.

FIG. 6 is a flowchart of a method of identifying a replay transaction based on a blockchain integrated station according to embodiments of the present disclosure. The method includes the following steps:

At step S600, when the blockchain integrated station receives a transaction through a smart network card, the smart network card compares currently received transaction with historically received transactions in a network card cache.

At step S602, if a comparison result indicates that there is a historically received transaction the same as the currently received transaction, the smart network card determines the currently received transaction as a replay transaction.

In embodiments of the present disclosure, the smart network card can compare the currently received transaction with all historically received transactions one by one to determine whether the currently received transaction is a replay transaction.

In addition, considering that some historically received transactions are too old to be replayed, the currently received transaction can be compared with recent historically received transactions.

Specifically, the smart network card can write each received transaction into a transaction identification pool in the network card cache, and take out the historically received transactions with a reception time length greater than a designated time length from the transaction identification pool. The reception time length refers to a time length between a reception time point and a current time point. The smart network card can compare the currently received transaction with the historically received transactions in the transaction identification pool.

Further, in an actual application, a transaction usually has a valid time length. If a transaction reception time is too long from now, the transaction will become invalid. It is meaningless to replay those historically received transactions that are too old. Therefore, the above-mentioned designated time length can be specifically set to be no less than a valid time length of a transaction.

In embodiments of the present disclosure, the smart network card can classify those identified replay transactions into a replay transaction set. The replay transaction set does not participate in the blockchain consensus, or the replay transaction set is not sent to the CPU. Therefore, the replay transaction can be filtered. In addition, the smart network card can also discard the replay transaction.

According to the method shown in FIG. 6, a blockchain integrated station includes a CPU and a smart network card, and the smart network card is a network card having a built-in processor or microprocessor and can perform data computing and processing. The smart network card can replace the CPU to perform replay transaction identification.

According to the embodiments of the present disclosure, the following technical effects can be achieved:

1. The smart network card is specifically in charge of identifying a replay transaction to offload this part of operation burden for the CPU. In this case, the operation efficiency of the blockchain integrated station serving as a node is improved and the CPU can also execute more transactions within a unit time, thereby improving throughput.

2. The replay transaction can be identified and filtered at the network card thus the replay transaction generally will not flow through the CPU, so that the replay transaction can be identified and filtered more rapidly.

Figure 7:
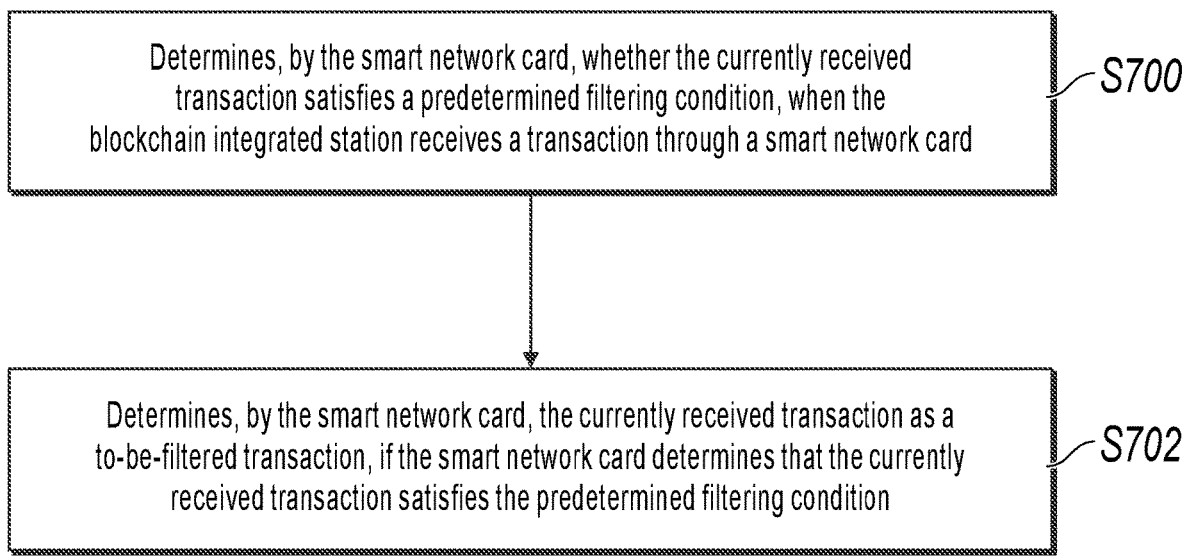
FIG. 7 is a flowchart of a method of identifying a to-be-filtered transaction based on a blockchain integrated station according to embodiments of the present disclosure.

FIG. 7 is a flowchart of a method of identifying a to-be-filtered transaction based on a blockchain integrated station according to embodiments of the present disclosure. The method includes the following steps:

At step S700, when the blockchain integrated station receives a transaction through a smart network card, the smart network card determines whether the currently received transaction satisfies a predetermined filtering condition.

At step S702, if the smart network card determines that the currently received transaction satisfies the predetermined filtering condition, the smart network card determines the currently received transaction as a to-be-filtered transaction.

The smart network card can discard the identified to-be-filtered transaction, or retain and classify the to-be-filtered transaction into a to-be-filtered transaction set. The to-be-filtered transaction set does not participate in a blockchain consensus, or is not sent to the CPU. Therefore, the to-be-filtered transaction can be filtered.

In addition, the to-be-filtered transactions mainly involve the following two cases:

1. A service operation type corresponding to a service operation realized by a transaction is not a service operation type in charged by the present node (the blockchain integrated station), nor belong to a service operation type set corresponding to the present node. For example, due to limited transaction processing capability, the present node will only selectively execute transactions of some specific service operation types. For another example, some service operation types are written into a blacklist of the present node, and the present node refuses to execute the transactions of these service operation types.

In addition, it should be noted that for a blockchain network of such distributed architecture, failure of a small number of nodes to execute some transactions will not affect a world state of the entire blockchain network, and the world state will still be synchronized to each node.

2. A service operation type corresponding to a service operation realized by a transaction is a service operation type in the charge of the present node, and belongs to a service operation type set corresponding to the present node. However, specific contents of the service operation realized by the transaction are illegal, nor belong to legal operation contents corresponding to the service operation type. For example, a transaction is used to realize a query operation, but the query operation is specifically used to perform repeated meaningless queries for a particular parameter value, and therefore the transaction actually belongs to an attack transaction for a blockchain network and is illegal. For another example, a transaction is used to perform a transfer operation but the balance of the transferor is insufficient, and the transaction is also illegal. For another example, an account of a transaction initiator has no operation authority, and thus the transaction is also illegal.

In addition, according to the method shown in FIG. 7, a more complex filtering condition can be configured for the smart network card. For example, the following filtering condition can be configured:

(A particular time period) and (initiated by account A) and (sending to account B or C for operation).

According to the method shown in FIG. 7, a blockchain integrated station includes a CPU and a smart network card, and the smart network card is a network card having a built-in processor or microprocessor and can perform data computing and processing. The smart network card can replace the CPU to perform to-be-filtered transaction identification.

According to the embodiments of the present disclosure, the following technical effects can be achieved:

1. The smart network card is specifically in charge of identifying a to-be-filtered transaction to offload this part of operation burden for the CPU. In this case, the operation efficiency of the blockchain integrated station serving as a node is improved and the CPU can also execute more transactions within a unit time, thereby improving throughput.

2. The to-be-filtered transaction can be identified and filtered at the network card and thus the to-be-filtered transaction generally will not flow through the CPU, so that the to-be-filtered transaction is identified and filtered more rapidly.

Figure 8:
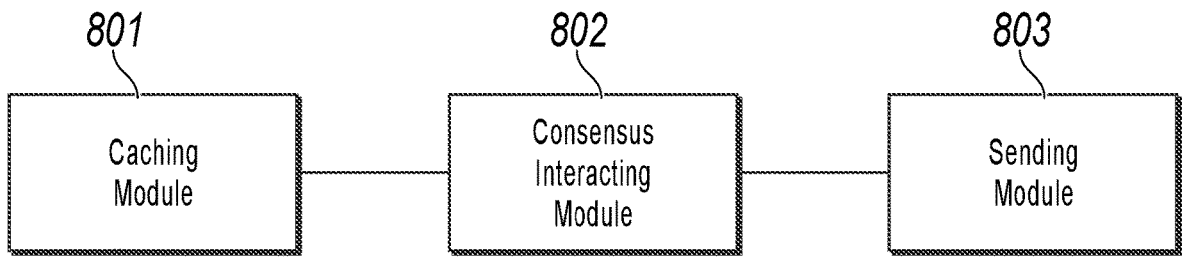
FIG. 8 is a structural schematic diagram of an apparatus for processing a transaction based on a blockchain integrated station according to embodiments of the present disclosure.

FIG. 8 is a structural schematic diagram of an apparatus for processing a transaction based on a blockchain integrated station according to embodiments of the present disclosure. The method is applied to a smart network card of the blockchain integrated station, and the blockchain integrated station further includes a CPU and is any node of a blockchain network. The apparatus includes: a caching module 801, configured to, when the blockchain integrated station receives a transaction through the smart network card, write the received transaction into a network card cache; a consensus interacting module 802, configured to perform consensus interaction with other nodes of the blockchain network based on the transaction in the network card cache in a process that the blockchain integrated station participates in a blockchain consensus; and a sending module 803, configured to determine and send a to-be-executed transaction list to the CPU based on a result of the consensus.

Figure 9:
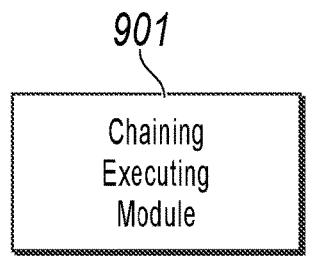
FIG. 9 is a structural schematic diagram of an apparatus for processing a transaction based on a blockchain integrated station according to embodiments of the present disclosure.

FIG. 9 is a structural schematic diagram of an apparatus for processing a transaction based on a blockchain integrated station according to embodiments of the present disclosure. The apparatus is applied to a CPU of the blockchain integrated station, and the blockchain integrated station further includes a smart network card and is any node of a blockchain network. The apparatus includes: a chaining executing module 901, configured to execute transaction based on a to-be-executed transaction list sent by the smart network card and complete transaction chaining.

Figure 10:
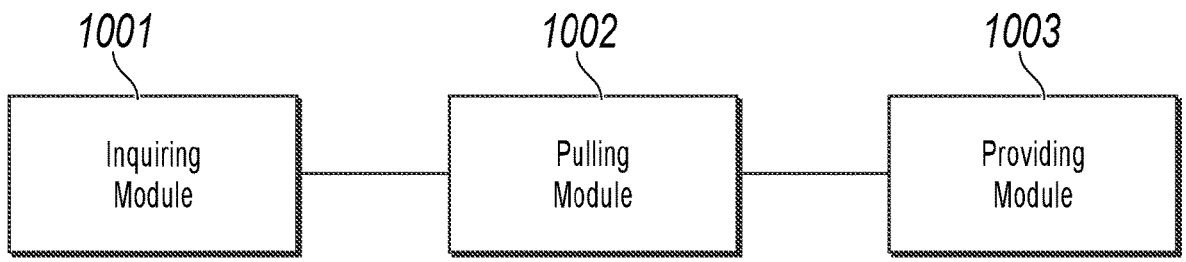
FIG. 10 is a structural schematic diagram of an apparatus for synchronizing data based on a blockchain integrated station according to embodiments of the present disclosure.

FIG. 10 is a structural schematic diagram of an apparatus for synchronizing data based on a blockchain integrated station according to embodiments of the present disclosure. The apparatus is applied to a smart network card of the blockchain integrated station, and the blockchain integrated station further includes a CPU and is any node of a blockchain network. The apparatus includes: an inquiring module 1001, configured to inquire other nodes about whether there is to-be-synchronized block data; a pulling module 1002, configured to pull the to-be-synchronized block data from other nodes if determining that there is the to-be-synchronized block data; and a providing module 1003, configured to provide the to-be-synchronized block data for the CPU.

Figure 11:
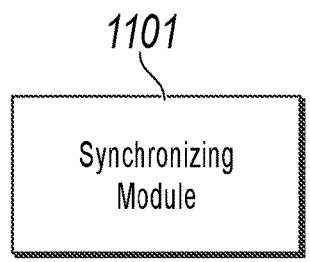
FIG. 11 is a structural schematic diagram of an apparatus for synchronizing data based on a blockchain integrated station according to embodiments of the present disclosure.

FIG. 11 is a structural schematic diagram of an apparatus for synchronizing data based on a blockchain integrated station according to embodiments of the present disclosure. The apparatus is applied to a CPU of the blockchain integrated station, and the blockchain integrated station further includes a smart network card and is any node of a blockchain network. The apparatus includes: a synchronizing module 1101, configured to complete data synchronization based on to-be-synchronized block data.

Figure 12:
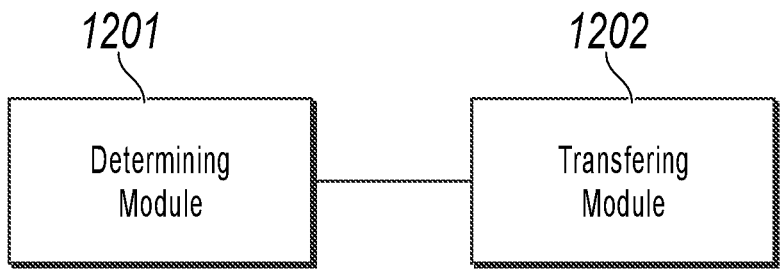
FIG. 12 is a structural schematic diagram of an apparatus for transferring a transaction based on a blockchain integrated station according to embodiments of the present disclosure.

FIG. 12 is a structural schematic diagram of an apparatus for transferring a transaction based on a blockchain integrated station according to embodiments of the present disclosure. The apparatus is applied to a smart network card of the blockchain integrated station, and the blockchain integrated station further includes a CPU and is any node of a blockchain network. The apparatus includes: a determining module 1201, configured to determine other to-be-transferred nodes when the blockchain integrated station receives a transaction through the smart network card; and a transferring module 1202, configured to transfer the transaction to the to-be-transferred nodes.

Figure 13:
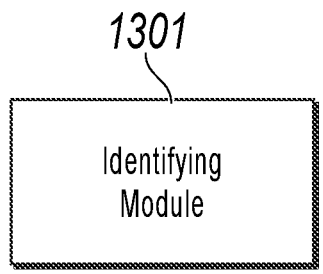
FIG. 13 is a structural schematic diagram of an apparatus for identifying a replay transaction based on a blockchain integrated station according to embodiments of the present disclosure.

FIG. 13 is a structural schematic diagram of an apparatus for identifying a replay transaction based on a blockchain integrated station according to embodiments of the present disclosure. The apparatus is applied to a smart network card of the blockchain integrated station, and the blockchain integrated station further includes a CPU and is any node of a blockchain network. The apparatus includes: an identifying module 1301, configured to, when the blockchain integrated station receives a transaction through the smart network card, identify currently received transaction, including: comparing the currently received transaction with historically received transactions in a network card cache; and if a comparison result indicates that there is a historically received transaction same as the currently received transaction, determining the currently received transaction as a replay transaction.

Figure 14:
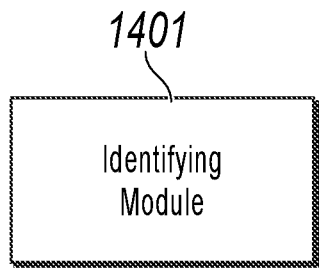
FIG. 14 is a structural schematic diagram of an apparatus for identifying a to-be-filtered transaction based on a blockchain integrated station according to embodiments of the present disclosure.

FIG. 14 is a structural schematic diagram of an apparatus for identifying a to-be-filtered transaction based on a blockchain integrated station according to embodiments of the present disclosure. The apparatus is applied to a smart network card of the blockchain integrated station, and the blockchain integrated station further includes a CPU and is any node of a blockchain network. The method includes: an identifying module 1401, configured to, when the blockchain integrated station receives a transaction through the smart network card, identify currently received transaction, including: determining whether the currently received transaction satisfies a predetermined filtering condition; and if determining that the currently received transaction satisfies the predetermined filtering condition, determining the currently received transaction as a to-be-filtered transaction.

Embodiments of the present disclosure further provide a computer device at least including a memory, a CPU, a smart network card, and computer programs that are stored on the memory and run on the smart network card. When executing the programs, the smart network card implements the functions of each method in the present disclosure.

Figure 15:
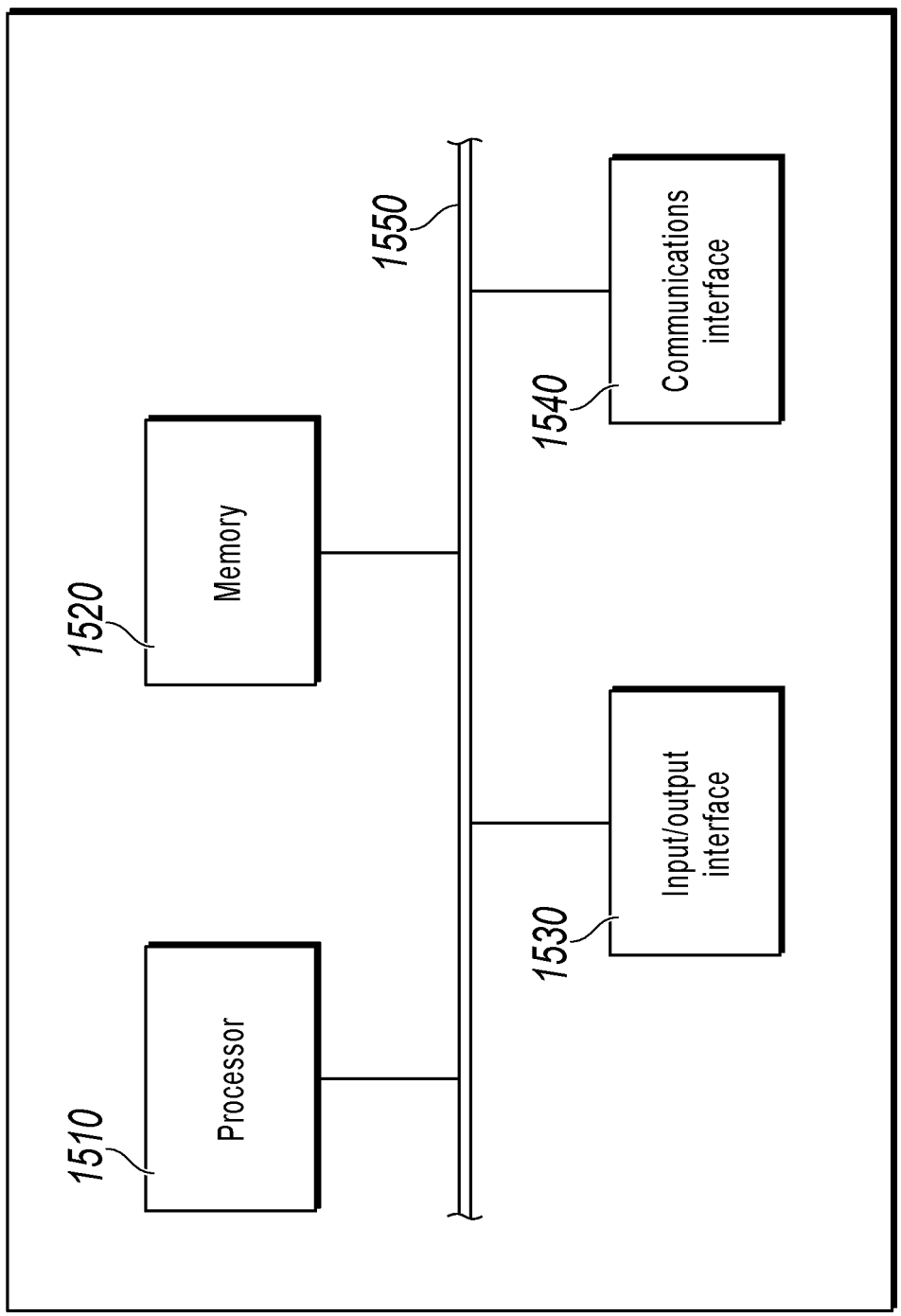
FIG. 15 is a structural schematic diagram of a computer device for configuring a method of embodiments of the present disclosure.

FIG. 15 is a hardware structural schematic diagram of a more specific computer device according to embodiments of the present disclosure. The device can include: a processor 1510, a memory 1520, an input/output interface 1530, a communication interface 1540 and a bus 1550. The processor 1510, the memory 1520, the input/output interface 1530 and the communication interface 1540 realize communication connection with each other in the device through the bus 1550.

The processor 1510 can be implemented by a general central processing unit (CPU), a microprocessor, an application specific integrated circuit (ASIC), or one or more integrated circuits, or the like to execute relevant programs, so as to implement the technical solutions according to the embodiments of the present disclosure.

The memory 1520 can be implemented by a read only memory (ROM), a random access memory (RAM), a static storage device, a dynamic storage device, or the like. The memory 1520 can store an operating system and other application programs. When the technical solutions according to the embodiments of the present disclosure are implemented by software or firmware, relevant program codes stored in the memory 1520 are invoked and executed by the processor 1510.

The input/output interface 1530 is used to connect an inputting/outputting module, so as to realize information input and output. The inputting/outputting module can be configured as a component (not shown) in the device, or can be externally connected to the device to provide corresponding functions. The input device can include a keyboard, a mouse, a touch screen, a microphone, various sensors, and the like, and the output device can include a display, a speaker, a vibrator, an indicator light, and the like.

The communication interface 1540 is used to connect a communication module (not shown), so as to realize communication interaction between the device and other devices. The communication module can realize communication in a wired manner (such as a USB and a network cable) or in a wireless manner (such as a mobile network, WIFI and Bluetooth).

The bus 1550 includes a channel transmitting information between different components (such as the processor 1510, the memory 1520, the input/output interface 1530 and the communication interface 1540) of the device.

It should be noted that although the above-mentioned device only shows the processor 1510, the memory 1520, the input/output interface 1530, the communication interface 1540 and the bus 1550, the device can further include other components needed for normal operation in a specific implementation process. In addition, persons skilled in the art can understand that the above-mentioned device can only include components needed for the solution according to the embodiments of the present disclosure, rather than all components shown in the drawings.

Embodiments of the present disclosure further provide a computer readable storage medium storing computer programs, and the programs are executed by a smart network card to implement functions of each method in the present disclosure.

The computer readable medium includes permanent, non-permanent, mobile and non-mobile media, which can realize information storage by any method or technology. The information can be computer readable instructions, data structures, program modules and other data. Examples of the computer storage medium include but not limited to: a phase change random access memory (PRAM), a Static Random Access Memory (SRAM), a Dynamic Random Access Memory (DRAM), and other types of RAMs, Read-Only Memories (ROM), Electrically-Erasable Programmable Read-Only Memories (EEPROM), Flash Memories, or other memory technologies, CD-ROMs, digital versatile discs (DVD) or other optical storages, cassette type magnetic tapes, magnetic disk storages, or other magnetic storage devices or any other non-transmission mediums for storing information accessible by computing devices. According to the definition of the specification, the computer readable medium does not include transitory computer readable media, such as modulated data signals and carriers.

It can be known from descriptions of the above embodiments that persons skilled in the art can clearly understand that the embodiments of the present disclosure can be implemented by means of software and a necessary general hardware platform. Based on such understanding, the technical solutions of embodiments of the present disclosure essentially or a part contributing to the existing technology can be embodied in the form of a software product, and the computer software product can be stored in a storage medium, such as a ROM/RAM, a diskette or a compact disk, and includes several instructions for enabling a computer device (such as a personal computer, a server or a network device) to execute the methods of different embodiments or some parts of the embodiments of the present disclosure.

The systems, methods, modules or units described in the above-mentioned embodiments can be specifically implemented by a computer chip or an entity, or can be implemented by a product with a particular function. A typical implementing device can be a computer, and the computer can specifically be a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

The embodiments in the present disclosure are described in a progressive manner, each embodiment focuses on differences from other embodiments, and same or similar parts among the embodiments can be referred to each other. Especially, because apparatus embodiments are basically similar to method embodiments, simple descriptions are made to the apparatus embodiments, and relevant parts can be referred to part of the descriptions of the method embodiments. The apparatus embodiments described above are merely illustrative, where modules described as separate members can be or does not have to be physically separated, and functions of different modules can be implemented in the same or several software and/or hardware during implementation of the embodiments of the present disclosure. Part or all of the modules can also be selected according to actual needs to achieve the objectives of the solution of the embodiment. Persons of ordinary skill in the art can understand and implement the solutions without creative work.

The above-mentioned descriptions are merely specific embodiments of the present disclosure. It should be noted that persons of ordinary skill in the art can also make several improvements and modifications without departing from the principles of the embodiments of the present disclosure, and these improvements and modifications shall also be included in the scope of protection of embodiments of the present disclosure.

What is claimed is:

1. A blockchain integrated station, comprising:
a central processing unit (CPU); and
a smart network card, wherein the smart network card of the blockchain integrated station comprises a processor different from the CPU of the blockchain integrated station, wherein the smart network card of the blockchain integrated station replaces the CPU of the blockchain integrated station for participation in a blockchain consensus of a blockchain network on behalf of the blockchain integrated station, and the smart network card of the blockchain integrated station is configured to:
receive a transaction of the blockchain network, wherein the blockchain integrated station is a blockchain node of the blockchain network;
write the transaction into a cache;
perform consensus interactions with other blockchain nodes of the blockchain network based on the transaction in the cache;
determine, based on a result of the blockchain consensus, a to-be-executed transaction list; and
send the to-be-executed transaction list, rather than the transaction, to the CPU of the blockchain integrated station,
wherein the CPU of the blockchain integrated station is configured to:
receive, from the smart network card of the blockchain integrated station, the to-be-executed transaction list; and
perform transaction execution based on the to-be-executed transaction list.

2. The blockchain integrated station according to claim 1, wherein the CPU of the blockchain integrated station is configured to perform computation-intensive operations that comprise transaction executing and storage processing, and the smart network card of the blockchain integrated station is configured to perform network-I/O-intensive operations that comprise blockchain consensus processing.

3. The blockchain integrated station according to claim 2, wherein the CPU of the blockchain integrated station is configured to complete transaction chaining after executing transactions based on the to-be-executed transaction list.

4. The blockchain integrated station according to claim 1, wherein:
the smart network card of the blockchain integrated station is configured to:
receive consensus configuration modification information; and
in response to receiving the consensus configuration modification information, send the consensus configuration modification information to the CPU of the blockchain integrated station.

5. The blockchain integrated station according to claim 4, wherein the CPU of the blockchain integrated station is configured to:
receive the consensus configuration modification information from the smart network card of the blockchain integrated station; and
modify a consensus configuration locally stored in the blockchain integrated station based on the consensus configuration modification information.

6. The blockchain integrated station according to claim 1, wherein:
the CPU of the blockchain integrated station is configured to generate an execution result based on the to-be-executed transaction list; and
the smart network card of the blockchain integrated station is configured to receive the execution result as reference information of a next blockchain consensus.

7. The blockchain integrated station according to claim 1, further comprising one or more of a smart contract processing chip or a cryptographic acceleration card.

8. The blockchain integrated station according to claim 1, wherein the processor of the smart network card of the blockchain integrated station comprises a built-in processor or microprocessor.

9. A blockchain system, comprising one or more blockchain nodes of a blockchain network, wherein at least one of the one or more blockchain nodes is implemented using a blockchain integrated station, wherein the blockchain integrated station comprises:
   a central processing unit (CPU); and
   a smart network card, wherein the smart network card comprises a processor different from the CPU, wherein the smart network card replaces the CPU for participation in a blockchain consensus of the blockchain network on behalf of the blockchain integrated station, and the smart network card is configured to:
      receive a transaction of the blockchain network, wherein the blockchain integrated station is a blockchain node of the blockchain network;
      write the transaction into a cache;
      perform consensus interactions with other blockchain nodes of the blockchain network based on the transaction in the cache;
      determine, based on a result of the blockchain consensus, a to-be-executed transaction list; and
      send the to-be-executed transaction list, rather than the transaction, to the CPU, wherein the CPU is configured to:
         receive, from the smart network card, the to-be-executed transaction list; and
         performs transaction execution based on the to-be-executed transaction list.

10. The blockchain system according to claim 9, wherein the CPU is configured to perform computation-intensive operations that comprise transaction executing and storage processing, and the smart network card is configured to perform network-I/O-intensive operations that comprise blockchain consensus processing.

11. The blockchain system according to claim 10, wherein the CPU is configured to complete transaction chaining after executing transactions based on the to-be-executed transaction list.

12. The blockchain system according to claim 9, wherein the smart network card is configured to:
   receive consensus configuration modification information; and
   in response to receiving the consensus configuration modification information, send the consensus configuration modification information to the CPU.

13. The blockchain system according to claim 12, wherein the CPU is configured to:
   receive the consensus configuration modification information from the smart network card; and
   modify a consensus configuration locally stored in the blockchain integrated station based on the consensus configuration modification information.

14. The blockchain system according to claim 9, wherein:
   the CPU is configured to generate an execution result based on the to-be-executed transaction list; and
   the smart network card is configured to receive the execution result as reference information of a next blockchain consensus.

15. The blockchain system according to claim 9, further comprising one or more of a smart contract processing chip or a cryptographic acceleration card.

16. The blockchain system according to claim 9, wherein the processor of the smart network card comprises a built-in processor or microprocessor.

17. A computer-implemented method comprising:
   receiving, by a smart network card of a blockchain integrated station, a transaction of a blockchain network, wherein the blockchain integrated station comprises a central processing unit (CPU) and the smart network card, the smart network card of the blockchain integrated station comprises a processor different from the CPU of the blockchain integrated station, wherein the smart network card of the blockchain integrated station replaces the CPU of the blockchain integrated station for participation in a blockchain consensus of the blockchain network on behalf of the blockchain integrated station, and the blockchain integrated station is a blockchain node of the blockchain network;
   writing, by the smart network card of the blockchain integrated station, the transaction into a cache;
   performing, by the smart network card of the blockchain integrated station, consensus interactions with other blockchain nodes of the blockchain network based on the transaction in the cache;
   determining by the smart network card of the blockchain integrated station and based on a result of the blockchain consensus, a to-be-executed transaction list; and
   sending, by the smart network card of the blockchain integrated station, the to-be-executed transaction list, rather than the transaction, to the CPU of the blockchain integrated station, wherein the CPU of the blockchain integrated station is configured to:
      receive, from the smart network card of the blockchain integrated station, the to-be-executed transaction list; and
      perform transaction execution based on the to-be-executed transaction list.

18. The computer-implemented method according to claim 17, wherein the CPU of the blockchain integrated station is configured to perform computation-intensive operations that comprise transaction executing and storage processing, and the smart network card of the blockchain integrated station is configured to perform network-I/O-intensive operations that comprise blockchain consensus processing.

19. The computer-implemented method according to claim 18, further comprising completing, by the blockchain integrated station, transaction chaining after executing transactions based on the to-be-executed transaction list.

20. The computer-implemented method according to claim 17, further comprising:
   receiving, by the blockchain integrated station, consensus configuration modification information; and
   in response to receiving the consensus configuration modification information, sending, by the smart network card of the blockchain integrated station, the consensus configuration modification information to the CPU of the blockchain integrated station.

* * * * *